US008160271B2

(12) United States Patent
Almquist et al.

(10) Patent No.: US 8,160,271 B2
(45) Date of Patent: Apr. 17, 2012

(54) VARIABLE NOISE MASKING DURING PERIODS OF SUBSTANTIAL SILENCE

(75) Inventors: Edward Almquist, Bartlett, IL (US); Steven P. DeCabooter, Palatine, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 716 days.

(21) Appl. No.: 12/256,574

(22) Filed: Oct. 23, 2008

(65) Prior Publication Data

US 2010/0104112 A1 Apr. 29, 2010

(51) Int. Cl.
*H04B 15/00* (2006.01)

(52) U.S. Cl. ........... 381/94.1; 381/92; 381/93; 381/94.2

(58) Field of Classification Search ................. 381/94.1, 381/94.2, 92, 93
See application file for complete search history.

(56) References Cited

U.S. PATENT DOCUMENTS 5,625,684 A 4/1997 Matouk et al.
7,039,207 B1 5/2006 Elrod et al.

FOREIGN PATENT DOCUMENTS

WO WO 01/37254 5/2001
WO WO 01/73759 10/2001

OTHER PUBLICATIONS

Painter, Ted and Andreas Spanias, "Perceptual Coding of Digital Audio," Proceedings of the IEEE, vol. 88, No. 4, Apr. 2000, pp. 451-513.

*Primary Examiner* — Long Pham

(57) ABSTRACT

Methods and systems for masking audio noise are disclosed. One apparatus includes a silence detector configured to detect a period of substantial silence in an audio signal; a masking noise source operably coupled to the silence detector, the masking noise source configured to generate a noise signal in response to the silence detector detecting the period of substantial silence; and at least one combining device operably coupled to the masking noise source, the at least one combining device configured to contribute to combining the audio signal and the noise signal. A method includes detecting a period of substantial silence in an audio signal; and combining masking noise with the audio signal during the period of substantial silence.

16 Claims, 5 Drawing Sheets

VARIABLE NOISE MASKING DURING PERIODS OF SUBSTANTIAL SILENCE

BACKGROUND

This invention relates generally to audio communications. More particularly, the invention relates to masking interference noise in audio communications.

SUMMARY

In one respect, disclosed is an apparatus including a silence detector configured to detect a period of substantial silence in an audio signal; a masking noise source operably coupled to the silence detector, the masking noise source configured to generate a noise signal in response to the silence detector detecting the period of substantial silence; and at least one combining device operably coupled to the masking noise source, the at least one combining device configured to contribute to combining the audio signal and the noise signal.

In another respect, disclosed is a method for masking audio noise including detecting a period of substantial silence in an audio signal; and combining masking noise with the audio signal during the period of substantial silence.

Numerous additional embodiments are also possible. In one or more various aspects, related articles, systems, and devices include but are not limited to circuitry, programming, electromechanical devices, or optical devices for effecting the herein referenced method aspects; the circuitry, programming, electromechanical devices, or optical devices can be virtually any combination of hardware, software, and firmware configured to effect the herein referenced method aspects depending upon the design choices of the system designer skilled in the art.

The foregoing is a summary and thus contains, by necessity, simplifications, generalizations and omissions of detail; consequently, those skilled in the art will appreciate that the summary is illustrative only and is not intended to be in any way limiting. Other aspects, features, and advantages of the devices, processes, or other subject matter described herein will become apparent in the teachings set forth herein.

In addition to the foregoing, various other method, device, and system aspects are set forth and described in the teachings such as the text (e.g., claims or detailed description) or drawings of the present disclosure.

BRIEF DESCRIPTION OF THE DRAWINGS

Other aspects and advantages of the invention may become apparent upon reading the detailed description and upon reference to the accompanying drawings.

Figure 1:
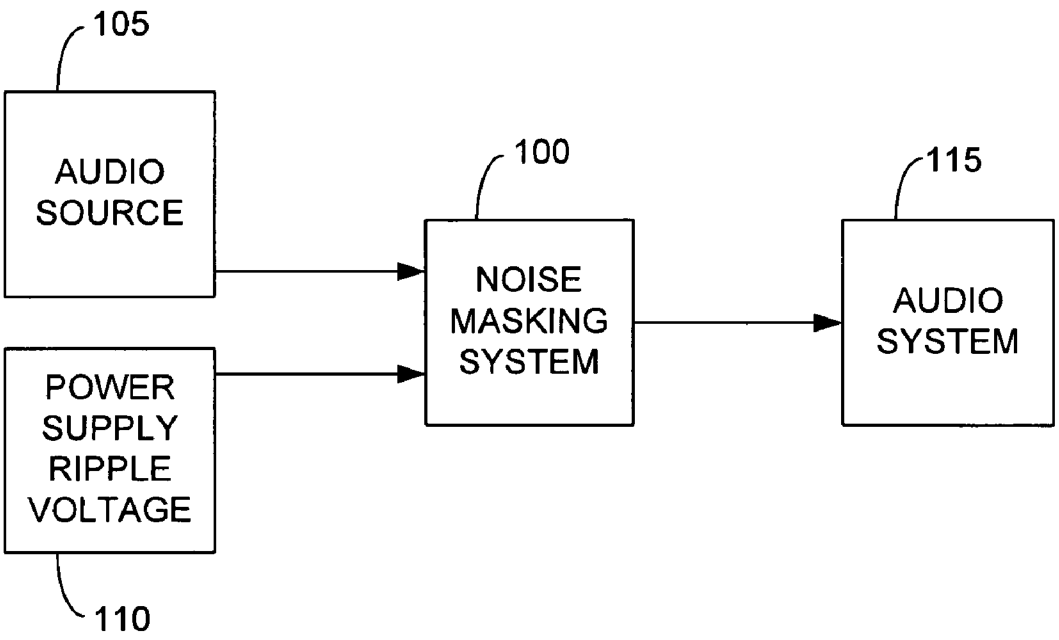
FIG. 1 is a block diagram of a system including a noise masking system.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

DETAILED DESCRIPTION

Certain terms are used throughout the following description and claims to refer to particular system components and configurations. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the terms "couple," "couples," "coupled," or "coupleable" are intended to mean either an indirect or direct electrical or wireless connection. Thus, if a first device couples to a second device, that connection may be through a direct electrical, optical, wireless connection, etc. or through an indirect electrical, optical, wireless connection, etc. by means of other devices and connections.

One or more embodiments of the invention are described below. It should be noted that these and any other embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art. Other embodiments may be utilized, and other changes may be made, without departing from the spirit or scope of the subject matter presented here.

An audio signal transmitted by a personal communications device to an audio system is susceptible to interference from sources of electrical noise. This noise is typically more easily perceived during periods of substantial silence, for instance, during periods of substantial silence during conversations. Interference from electrical noise may affect an audio signal in a variety of settings.

Among these settings is a circumstance in which, for instance, an audio signal transmitted by a personal communications device such as a cellular telephone to a vehicular audio system is susceptible to interference from a full wave rectified signal from the vehicle's alternator induced on the vehicle's battery supply. The frequency of this interference signal is in the audio frequency range, may typically be heard on a vehicular audio system, and is typically called "alternator whine." Alternator whine may be suppressed by applying power supply rejection to the interference signal, which attenuates the interference signal to a substantially inaudible level. Where such noise may be the result of inductive or capacitive coupling between wires in a vehicle's wire harness(es), the inference may be reduced or eliminated by routing the interference source and interference victim wires or with increased shielding of some or all of the wires.

Alternatively, according to some aspects of the invention, masking noise may be added to the audio signal to mask interference from sources of electrical noise. In some telematics systems a hands-free audio path, for example, from a communications device such as a cellular telephone to a vehicle audio system, is implemented using a 16-bit format, but typically, the digital audio of a cellular telephone using only 13 bits. Where a cellular telephone uses 13 bits out of 16 available bits for its audio signal, the 13 bits of data are typically shifted to the 13 most significant bit places of the 16-bit format and the least significant three bit places are padded with zeroes. In some aspects of the invention, masking noise may be added by randomizing the bits of an audio format not used by the audio signal, in the circumstances described here, the three bits typically padded with zeroes. The masking noise may be added during some parts of a conversation, such as during periods of substantial silence when interference may be more easily perceived, or at all times during a conversation. The amplitude, that is, the sound level, of the masking noise may be varied in response to the amplitude of the interference noise, or shaped in response to the frequency spectrum of the interference noise, as measured, for instance, on the battery power supply line. The masking noise may include white noise, such as additive white Gaussian noise (herein, "AWGN").

Turning now to FIG. 1, a block diagram of a system including a noise masking system is shown. Exemplary system 100, part of a vehicular audio system, includes aspects of the invention, details of which are discussed in connection with FIG. 2. The exemplary system 100 accepts input from an audio source 105, and on another input, it receives interference noise, e.g., a power supply ripple voltage from a power supply ripple voltage source 110 such as a car battery as affected by the alternator. The audio source 105 may include, for example, a cellular telephone or a pulse code modulation (herein, "PCM") signal source; the exemplary cellular telephone may be such a PCM signal source. The exemplary system 100 masks the noise and outputs the resulting signal to an audio system 115 such as the speaker system of an automobile audio system.

Figure 2:
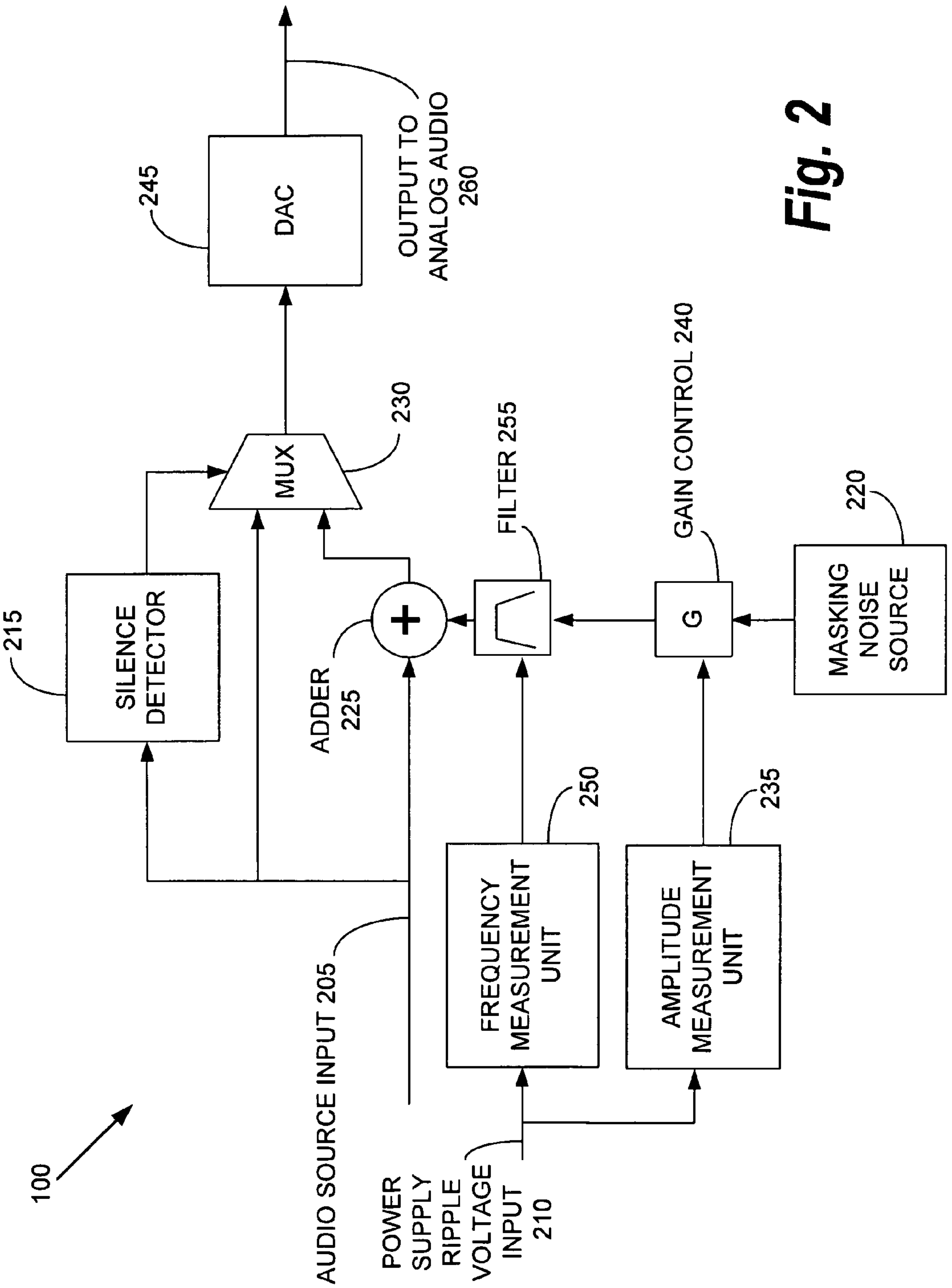
FIG. 2 is a block diagram of an apparatus for masking audio noise.

Turning now to FIG. 2, a block diagram of an apparatus for masking audio noise is shown. Exemplary system 100, part of a vehicular audio system, includes aspects of the invention. System 100 includes an audio source input 205 from the audio source 105 (e.g., a cellular telephone) and an interference noise input, e.g., a power supply ripple voltage input 210 from a power supply ripple voltage source 110 (e.g., a car battery as affected by the alternator). Some aspects of the invention include a silence detector 215 that may be used detect periods of substantial silence in a conversation being carried on the audio channel of the cellular telephone. Those skilled in the art will recognize that a silence detector 215 may be implemented in a number of ways already used in hands-free, voice recognition, and speakerphone technology. Some aspects of the invention may also include a masking noise source 220, an adder 225, and a multiplexer (herein, "MUX") 230. When the silence detector 215 detects a substantial silence, noise generated by the masking noise source 220 may be combined with the audio signal from the audio source input 205 via the adder 225 and the MUX 230. The noise generated by the masking noise source 220 may include a form of white noise, e.g., AWGN.

Some aspects of the invention include an amplitude measurement unit 235 that may measure the amplitude of the interference noise, e.g., the power supply ripple voltage on the power supply ripple voltage input 210. The power amplitude of masking noise generated by the masking noise source 220 may be varied in response to the measured amplitude of the interference noise, e.g., the power supply ripple voltage. In some aspects, the power amplitude of masking noise generated by the masking noise source 220 may be varied by adjusting a gain control 240.

Some aspects of the invention include a frequency measurement unit 250 that may measure the frequency spectrum, including, in some aspects, the fundamental frequency, of the interference noise, e.g., the power supply ripple voltage on the power supply ripple voltage input 210. The frequency spectrum of the noise generated by the masking noise source 220 may be shaped in response to the measured frequency spectrum, including, in some aspects, the fundamental frequency, of interference noise, e.g., the power supply ripple voltage. In some aspects, the shaping of the noise generated by the masking noise source 220 may be accomplished with a filter 255.

An amplitude measurement unit 235 and a frequency measurement unit 250 as described in connection with FIG. 2 may be used in conjunction with each other. Such use, however, in conjunction with each other, or the presence together of an amplitude measurement unit 235 and a frequency measurement unit 250, is not required.

FIG. 2 shows one aspect of the invention in which an output of the masking noise source 220 is coupled first to the gain control 240 and an output of the gain control 240 is coupled to the filter 255. Those skilled in the art will recognize that implementations of the invention that incorporate both a gain control 240 and a filter 255 are not limited to the depicted configuration. For example, an output of the masking noise source 220 may be coupled to the filter 225 and an output of the filter may be coupled to the gain control 240.

Noise from the masking noise source 220 may be always available at the adder 225 and available on a line from the adder 225 to the MUX 230. When the silence detector 215 detects a period of substantial silence in the signal from the audio source input 205, the silence detector 215 enables the MUX 230 to multiplex the audio signal from the audio source input 205 and the noise from the masking noise source 220 via the adder 225.

Alternatively, the adder 225 may be disabled such that noise from the masking noise source 220 is not available to the MUX 230 to be multiplexed with the audio signal from the audio source input 205. The silence detector 215 may be set or disabled such that it enables the MUX 230 to multiplex the audio signal from the audio source input 205 and the noise from the masking noise source 220 via the adder 225 during periods other than periods of substantial silence. The silence detector 215 also may be set or disabled such that it does not enable the MUX 230 to multiplex the audio signal from the audio source input 205 and the noise from the masking noise source 220 at any time. Alternatively, the silence detector 215 may be used to control the gain of the masking noise source 220 by means of the gain control 240 or by other means. Further, the silence detector 215 may be used to turn the masking noise source 220 on and off. The MUX 230 may be set or enabled to multiplex the audio signal from the audio source input 205 and the noise from the masking noise source 220 via the adder 225 during periods other than periods of substantial silence, or the MUX 230 set or disabled such that it does not multiplex the audio signal from the audio source input 105 and the noise from the masking noise source 220 at any time.

The output of the MUX 230 may be operably coupled to an input of a digital-to-audio converter (DAC) 245, which converts the digital output of the MUX 230 to an analog signal which is output on an output to analog audio 260 for an audio system 115 of a vehicle in which the system 100 is located. Thus, a digital audio signal to which masking noise has been added during period of substantial silence may be output from the MUX 230 to the DAC 245 for conversion to an analog signal with added noise, and the analog signal may be sent via the output to analog audio 260 to the audio system 115, which may be, for example, the vehicle's audio speakers.

Figure 3:
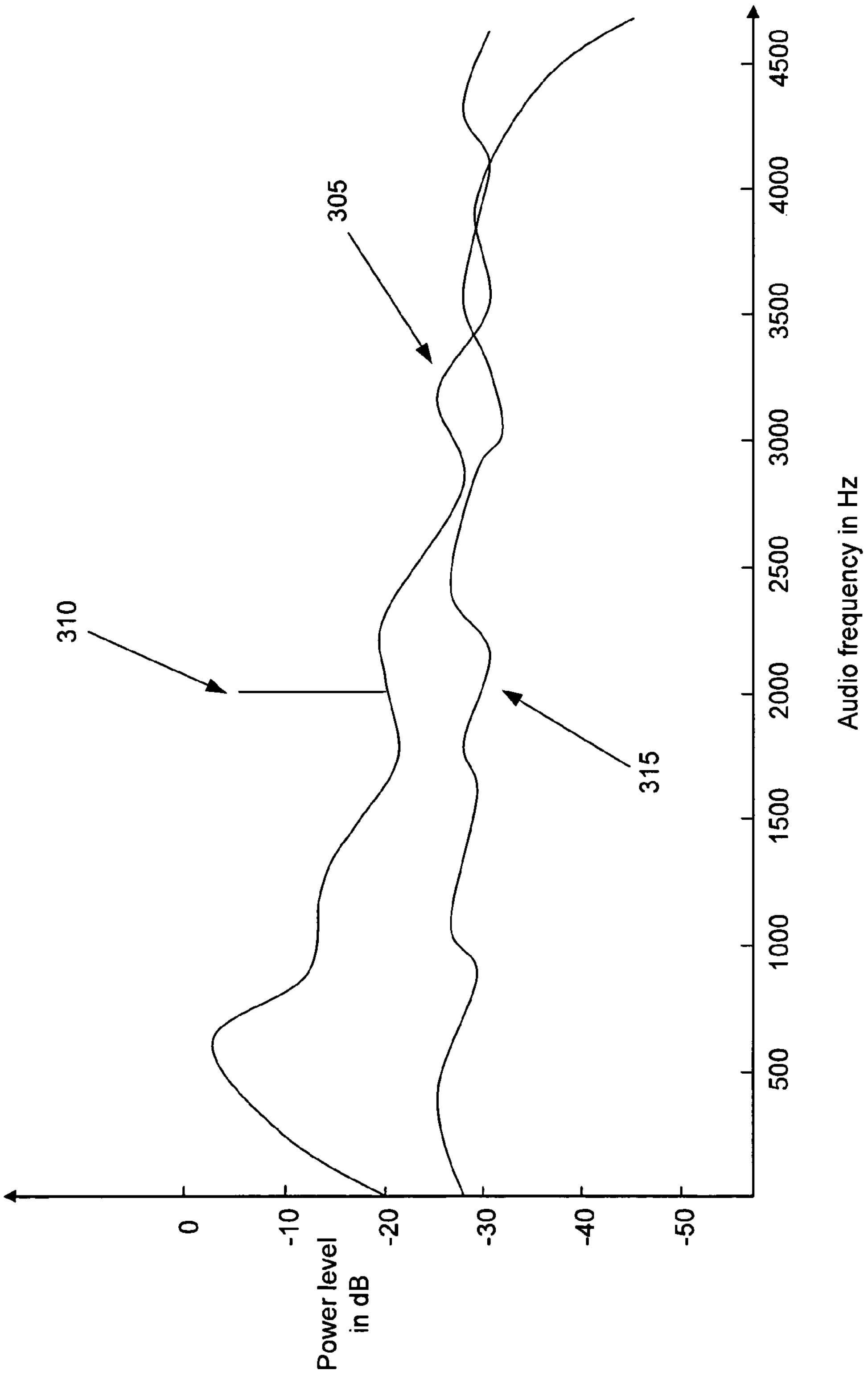
FIG. 3 is a graph illustrating an audio signal including interference noise, and masking noise.

Turning now to FIG. 3, a graph illustrating an audio signal including interference noise, and masking noise is shown. The vertical axis of the graph represents the power level of a signal, measured in decibels (dB) from an arbitrary reference point. The horizontal axis represents the audio frequency of the signal in Hertz (Hz). The signal 305 includes an audio signal including an interference signal at, e.g., 2 kHz, as represented by the spike 310. The signal 315 includes masking noise, an additive white Gaussian noise signal that is to be added to the audio signal to mask the interference signal. In terms of the system 100 of FIG. 1, the signal 305 includes the audio signal on the audio source input 205, with the spike 310 including the interference noise on, for instance, the power supply ripple voltage input 210, and the signal 315 includes the output of the masking noise source 220. The power amplitude of the signal 315 has been adjusted by the gain control 240 to mask the interference spike 310 included in the signal 305 according to a measurement of the interference noise, here, the exemplary power source ripple voltage of the signal on the power source ripple voltage input 210 as measured by the amplitude measurement unit 235.

Figure 4:
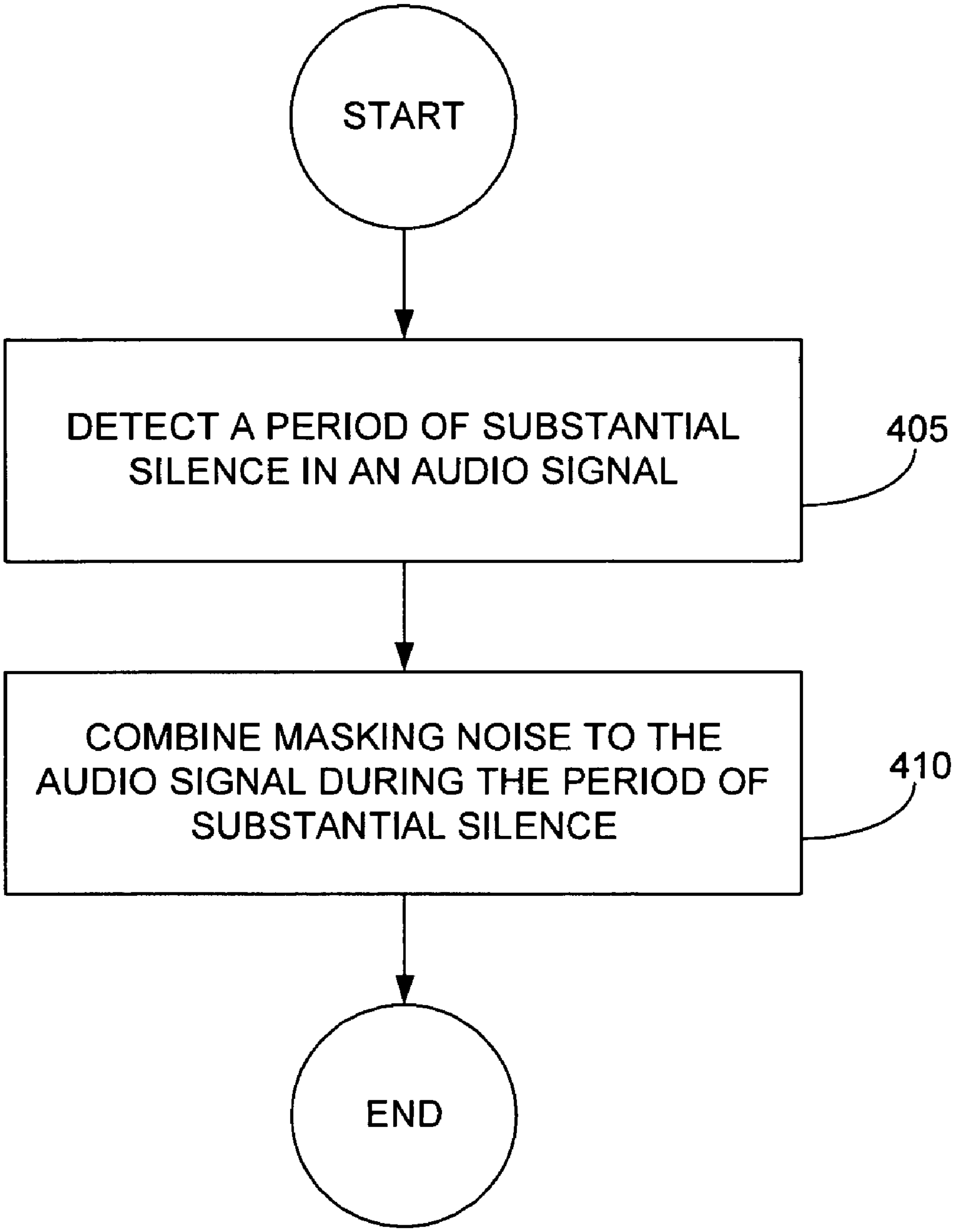
FIG. 4 is a first flow chart for a method of masking audio noise.

Turning now to FIG. 4, a flow chart for a method of masking audio noise is shown. The method shown may include one or more of the following operations: 405 and 410. Operation 405 may include detecting a period of substantial silence in an audio signal. Operation 405 may be performed, for example, by using the silence detector 215 to detect a period of substantial silence in an audio signal the from the audio source input 205 of FIG. 2. Operation 410 may include combining masking noise with the audio signal during the period of substantial silence. Operation 410 may be performed, for example, by using the adder 225 and MUX 230 of FIG. 2 to combine masking noise generated by the masking noise source 220 of FIG. 2, such as additive white Gaussian noise, with the audio signal from the audio source input 105 during the period of substantial silence.

Figure 5:
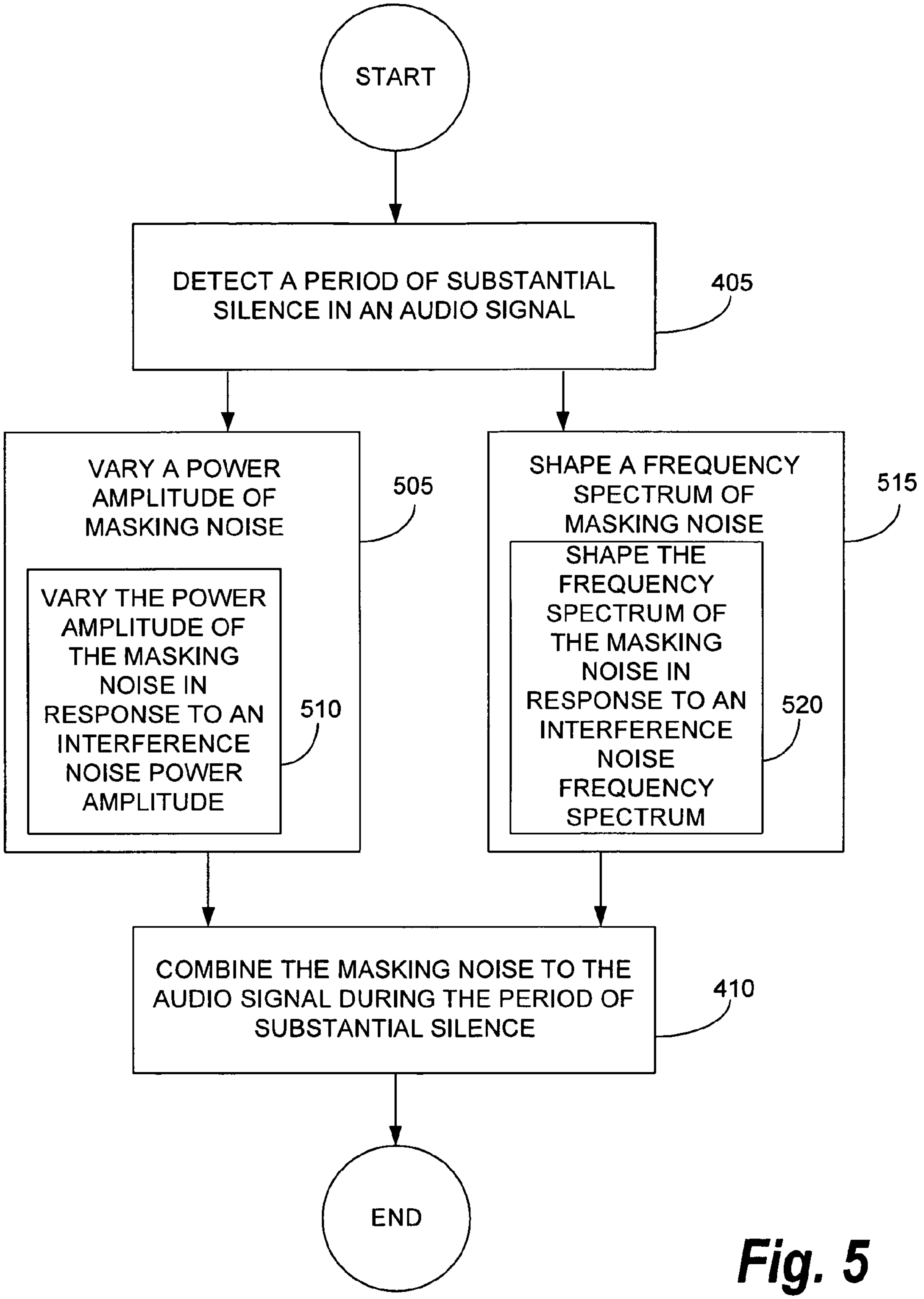
FIG. 5 is a second flow chart for a method of masking audio noise.

Turning now to FIG. 5, a flow chart for a method of masking audio noise is shown. The method shown may include one or more of the following operations: 405 (described elsewhere herein), 410 (described elsewhere herein), 505, 510, 515, and 520. Operation 505 may include varying a power amplitude of the masking noise. Continuing the example used in connection with the operations of FIG. 4, the the power amplitude of the masking noise generated by the masking noise source 220 of FIG. 2 may be varied using the gain control 240 of FIG. 2. Operation 510 may include varying the power amplitude of the masking noise in response to an interference noise power amplitude. Continuing the example used in connection with the operations of FIG. 4, the power amplitude of the masking noise generated by the masking noise source 220 of FIG. 2, for example, may be varied using the gain control 240, in response to a measurement of interference noise, e.g., the power source ripple voltage of the signal on the power source ripple voltage input 210 of FIG. 2 as measured by the amplitude measurement unit 235 of FIG. 2.

Operation 515 may include shaping a frequency spectrum of the masking noise. Continuing the example used in connection with the operations of FIG. 4, the frequency spectrum of masking noise generated by the masking noise source 220 of FIG. 2, for example, may be shaped using the filter 255. Operation 520 may include shaping a frequency spectrum of the masking noise in response to an interference noise frequency spectrum. Continuing the example used in connection with the operations of FIG. 4, the frequency spectrum of masking noise generated by the masking noise source 220 of FIG. 2, for example, may be shaped using the filter 255, in response to a measurement of the frequency spectrum including, in some aspects, the fundamental frequency, of interference noise, e.g., the power supply ripple voltage on the power supply ripple voltage input 210, using the frequency measurement unit 250.

Those of skill will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus for masking audio noise, comprising:

a silence detector configured to detect a period of substantial silence in an audio signal output from an audio system;

an interference noise amplitude measurement unit configured to measure amplitude of electrical noise that is capable of generating audible noise in the audio signal;

a masking noise source operably coupled to the silence detector and to the interference noise amplitude measurement unit, the masking noise source configured to generate a masking noise signal to be combined with the audio signal, in response to the silence detector detecting the period of substantial silence, and in response to the amplitude of the electrical noise; and at least one combining device operably coupled to the masking noise source and to the audio signal, the at least one combining device configured to combine the audio signal with the masking noise signal.

2. The apparatus of claim 1, wherein the at least one combining device includes an adder operably coupled to the masking noise source.

3. The apparatus of claim 1, wherein the at least one combining device includes a multiplexer operably coupled to the masking noise source.

4. The apparatus of claim 1, wherein the audio signal includes a pulse code modulation audio signal.

5. The apparatus of claim 1, wherein the masking noise includes white noise.

6. The apparatus of claim 5, wherein the white noise includes additive white Gaussian noise.

7. The apparatus of claim 1, wherein the masking noise includes a number of randomized bits in a digital audio format, wherein the randomized bits are a portion of the bits available in the digital audio format.

8. The apparatus of claim 1, further comprising:
a gain control operably coupled to the at least one combining device and operably coupled to the masking noise source.

9. The apparatus of claim 8, further comprising:
an amplitude measurement unit operably coupled to the gain control and operably coupled to an interference ripple voltage input.

10. The apparatus of claim 1, wherein an output signal of the masking noise source is variable in power amplitude.

11. The apparatus of claim 1, wherein the output signal of the masking noise source is variable in power amplitude in response to the interference noise amplitude.

12. The apparatus of claim 1, further comprising:
a filter operably coupled to the at least one combining device and operably coupled to the masking noise source.

13. The apparatus of claim 12, further comprising:
a frequency measurement unit operably coupled to the filter and operably coupled to interference ripple voltage input.

14. The apparatus of claim 1, wherein a frequency spectrum of an output signal of the masking noise source is shapeable.

15. The apparatus of claim 14, wherein the frequency spectrum of the output signal of the masking noise source is shapeable in response to an interference noise frequency spectrum.

16. The apparatus of claim 1, further comprising a vehicle, wherein the vehicle houses the apparatus.

* * * * *